United States Patent
Jeong et al.

(10) Patent No.: US 11,799,073 B2
(45) Date of Patent: Oct. 24, 2023

(54) ELECTRODE STRUCTURE, METHOD OF MANUFACTURING THE ELECTRODE STRUCTURE, AND SECONDARY BATTERY INCLUDING THE ELECTRODE STRUCTURE

(71) Applicant: Samsung Electronics Co., Ltd., Suwon-si (KR)

(72) Inventors: Huisu Jeong, Seongnam-si (KR); Hwiyeol Park, Hwaseong-si (KR); Kyounghwan Kim, Seoul (KR); Jeongkuk Shon, Hwaseong-si (KR); Junhyeong Lee, Seoul (KR); Sungjin Lim, Suwon-si (KR); Jin S. Heo, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 475 days.

(21) Appl. No.: 16/598,038

(22) Filed: Oct. 10, 2019

(65) Prior Publication Data
US 2020/0144608 A1    May 7, 2020

(30) Foreign Application Priority Data
Nov. 5, 2018   (KR) .................. 10-2018-0134437

(51) Int. Cl.
  *H01M 4/36*     (2006.01)
  *H01M 4/02*     (2006.01)

(52) U.S. Cl.
  CPC ...... *H01M 4/366* (2013.01); *H01M 2004/021* (2013.01); *H01M 2004/025* (2013.01)

(58) Field of Classification Search
  CPC ........... H01M 4/366; H01M 2004/021; H01M 2004/025; H02M 2004/021; H02M 2004/025

(Continued)

(56) References Cited

U.S. PATENT DOCUMENTS 8,168,326 B2   5/2012 Chiang et al.
9,011,702 B2   4/2015 Yamazaki et al.
(Continued)

FOREIGN PATENT DOCUMENTS

EP    1986253 A1   10/2008
JP    2005243371 A  9/2005
(Continued)

OTHER PUBLICATIONS

Yamamoto (translation), 2009.*
(Continued)

*Primary Examiner* — Matthew T Martin
*Assistant Examiner* — Paul Christian St Wyrough
(74) *Attorney, Agent, or Firm* — CANTOR COLBURN LLP

(57) ABSTRACT

An electrode structure includes: a base layer including a first active material; a plurality of active material plates, a plate of the plurality of active material plates including opposing side walls and a lower wall, wherein the lower wall is disposed on the base layer, wherein adjacent plates of the plurality of active material plates are spaced apart from each other, and wherein an active material plate of the plurality of active material plates includes a second active material; and a channel between adjacent plates of the plurality of active material plates, wherein the channel includes a first channel region defined by adjacent side walls of the adjacent plates, and a second channel region connected to the first channel region and defined by a lower wall of the adjacent plates and the base layer.

19 Claims, 14 Drawing Sheets

(58) Field of Classification Search
USPC .......................................................... 429/149
See application file for complete search history.

(56) References Cited

U.S. PATENT DOCUMENTS

| | | |
|---|---|---|
| 9,911,973 B2 | 3/2018 | Tajima et al. |
| 2011/0294005 A1 | 12/2011 | Kuriki et al. |
| 2014/0170466 A1 | 6/2014 | Spotnitz et al. |
| 2017/0084918 A1 | 3/2017 | Yang et al. |
| 2018/0090783 A1 | 3/2018 | Jeong et al. |

FOREIGN PATENT DOCUMENTS

| | | | | |
|---|---|---|---|---|
| JP | 2016058258 A | | 4/2016 | |
| KR | 20090109577 A | * | 10/2009 | ........ H01M 10/0525 |
| KR | 1020170023595 A | | 3/2017 | |
| KR | 1020170034606 A | | 3/2017 | |

OTHER PUBLICATIONS

European Search Report for European Patent Application No. 19206948.2 dated Mar. 9, 2020.
Doron Aurbach et al., "A short review of failure mechanisms of lithium metal and lithiated graphite anodes in liquid electrolyte solutions", Solid State Ionics, Jun. 2, 2002, pp. 405-416, vol. 148, Issues 3-4.

* cited by examiner

ELECTRODE STRUCTURE, METHOD OF MANUFACTURING THE ELECTRODE STRUCTURE, AND SECONDARY BATTERY INCLUDING THE ELECTRODE STRUCTURE

CROSS-REFERENCE TO RELATED APPLICATION

This application claims priority to and the benefit of Korean Patent Application No. 10-2018-0134437, filed on Nov. 5, 2018, in the Korean Intellectual Property Office, and all the benefits accruing therefrom under 35 U.S.C. § 119, the content of which is incorporated herein in its entirety by reference.

BACKGROUND

1. Field

The present disclosure relates to an electrode structure, a method of manufacturing the electrode structure, and a secondary battery including the electrode structure.

2. Description of the Related Art

A secondary battery refers to a battery capable of charging and discharging, unlike a primary battery that cannot be charged. In particular, a lithium secondary battery has a voltage, which is higher than a nickel-cadmium battery or a nickel-hydrogen battery, and has a higher specific energy. There remains a need for a high capacity secondary battery with an improved three-dimensional electrode structure.

SUMMARY

Provided are an electrode structure and a method of manufacturing the electrode structure, and a secondary battery including the electrode structure.

Additional aspects will be set forth in part in the description which follows and, in part, will be apparent from the description, or may be learned by practice of the presented embodiments.

According to an aspect of an embodiment, an electrode structure includes: a base layer including a first active material; a plurality of active material plates, a plate of the plurality of active material plates plate including opposing side walls and a lower wall, wherein the lower wall is disposed on the base layer, wherein adjacent plates of the plurality of active material plates are spaced apart from each other, and wherein an active material plate of the plurality of active material plates includes a second active material; and a channel between adjacent plates in the plurality of active material plates, wherein the channel includes a first channel region defined by adjacent side walls of the adjacent plates, and a second channel region connected to the first channel region and defined by a lower wall of the adjacent plates and the base layer, wherein a width of the second channel region is greater than a width of the first channel region.

The plurality of active material plates may be disposed obliquely on the base layer.

A lower wall of the plurality of active material plates and the base layer may form an angle of about 10 degrees to about 40 degrees.

The first active material and the second active material may be different from each other The first channel region may have a height along a first direction, a width along a second direction perpendicular to the first direction, and a length in a third direction perpendicular to the first direction and the second direction, and the first channel region may have an inclination with respect to the first direction.

An inclination angle of the first channel region with respect to the first direction may be about 10 degrees to about 40 degrees.

A content of the first active material in the base layer may be greater than or equal to a content of the second active material in the plurality of active material plates.

A volume fraction of the first active material, with respect to a total volume of the base layer, may be about 65% to about 100%, and a volume fraction of the second active material, with respect to a total volume of the plurality of active material plates, may be about 65% to about 100%.

A width of the second channel region may be about 2 times to about 100 times a width of the first channel region.

A height of a plate in the plurality of active material plates may be greater than a width of a plate in the plurality of active material plates, and a width of the first channel region may be less than the width of a plate in the plurality of active material plates.

Each of the first and second active materials may include a cathode active material.

According to an aspect of another embodiment, a method of manufacturing an electrode structure includes: providing a base layer including a first active material film; disposing a second active material film on a carrier; forming a plurality of first channel regions in the second active material film; forming a second channel region between the first active material film and a second active material film by disposing the first active material film on the second active material film; and sintering the second active material film and the first active material film to form a plurality of active material plates on a surface of the base layer, and a channel between the plurality of active material plates to manufacture the electrode structure.

The plurality of first channel regions may be formed by a blade stamping process, and a portion of the second active material film may be tilted on the carrier during the blade stamping process.

The portion of the second active material film that is tilted on the carrier may have an inclination with respect to a height direction.

A width of the second channel region may be greater than a width of the first channel region.

Each of the first active material film and the second active material film may include a binder, and the binder may be removed by sintering the first active material film and the second active material film.

According to an aspect of another embodiment, a secondary battery includes: a first electrode structure; a second electrode structure adjacent to and spaced apart from the first electrode structure; and a separation membrane between the first electrode structure and the second electrode structure, wherein the first electrode structure includes a base layer including a first active material, a plurality of active material plates, an active material plate of the plurality of active material plates including a side wall and a lower wall, wherein the lower wall is disposed on the base layer, and wherein adjacent plates the plurality of active material plates are spaced apart from each other, and wherein an active material plate of the plurality of active material plates includes a second active material; and a channel disposed between adjacent plates of the plurality of active material plates, wherein the channel includes a first channel region defined by adjacent side walls of the adjacent plates, and a second channel region connected to the first channel region and defined by a lower wall of adjacent plates and the base layer, wherein a width of the second channel region is greater than a width of the first channel region.

The plurality of active material plates may be disposed obliquely on the base layer.

The first channel region may have a height along a first direction, a width along a second direction perpendicular to the first direction, and a length in a third direction perpendicular to the first direction and the second direction, and wherein the first channel region has an inclination with respect to the first direction.

An inclination angle of the first channel region with respect to the first direction may be about 10 degrees to about 40 degrees.

A content of the first active material in the base layer may be greater than or equal to a content of the second active material in the plurality of active material plates.

A volume fraction of the first active material, with respect to a total volume of the base layer, may be about 65% to about 100%, and a volume fraction of the second active material, with respect to a total volume of the plurality of active material plates, may be about 65% to about 100%.

BRIEF DESCRIPTION OF THE DRAWINGS

These and/or other aspects will become apparent and more readily appreciated from the following description of the embodiments, taken in conjunction with the accompanying drawings in which:

FIGS. 10A, 10B, and 11 are SEM images of an embodiment of an electrode structure, in which FIG. 10B shows an expanded view of a portion of FIG. 10A;

DETAILED DESCRIPTION

Figure 1:
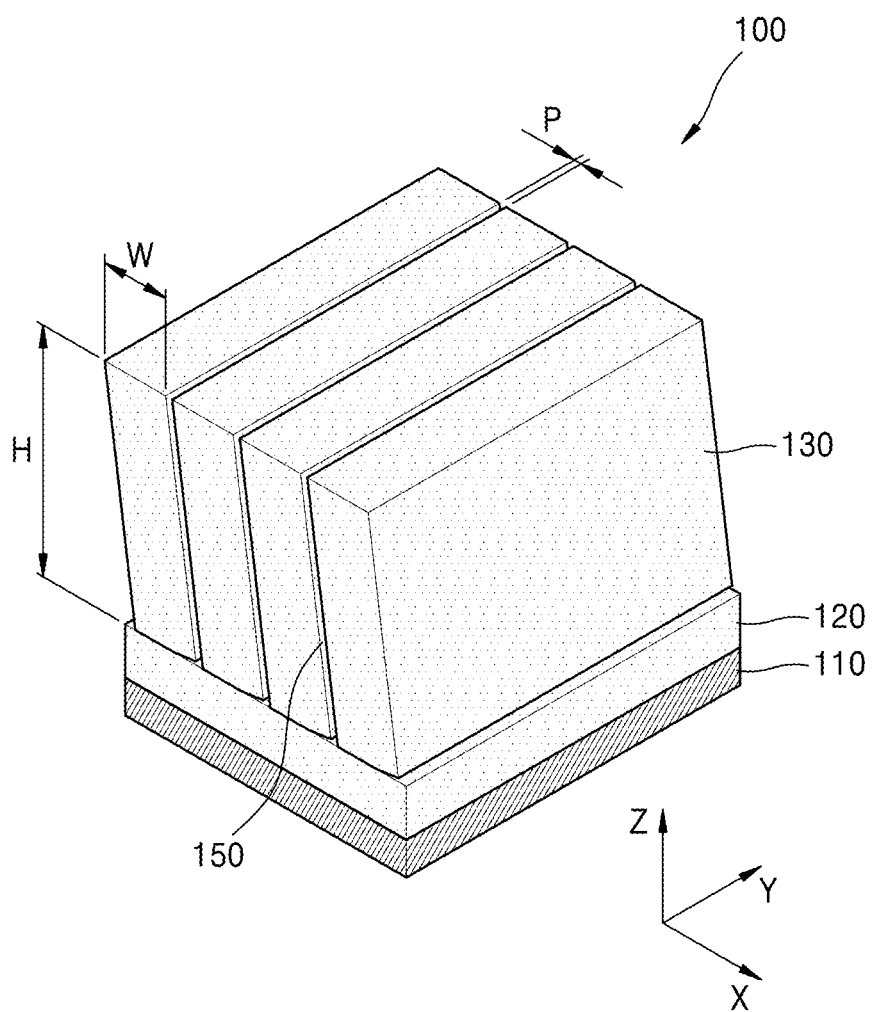
FIG. 1 is a perspective view illustrating an embodiment of an electrode structure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain various aspects.

Hereinafter, it will be understood that "on" may include not only being directly on, but also being in a non-contacting manner. Thus when an element is referred to as being "on" another element, it can be directly on the other element, or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. The singular forms "a," "an" and "the" are intended to include the plural forms as well, unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, when a portion "includes" an element, another element may be further included, rather than excluding the existence of the other element, unless otherwise described.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Also, operations of all methods described herein may be performed in any suitable order unless otherwise indicated herein or otherwise clearly contradicted by context. The disclosure is not limited to the described order of the operations. The use of any and all examples, or exemplary language provided herein, is intended merely to better illuminate the disclosure and shall not be construed to pose a limitation on the scope of the disclosure unless otherwise claimed.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless defined otherwise, all terms (including technical and scientific terms) in the specification may be defined as commonly understood by one having ordinary skilled in the art. The terms defined in a generally-used dictionary may not be interpreted ideally or exaggeratedly unless clearly defined. In addition, unless explicitly described to the contrary, the word "comprise" and variations such as "comprises" or "comprising," will be understood to imply the inclusion of stated elements but not the exclusion of any other elements.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present embodiments.

Figure 2:
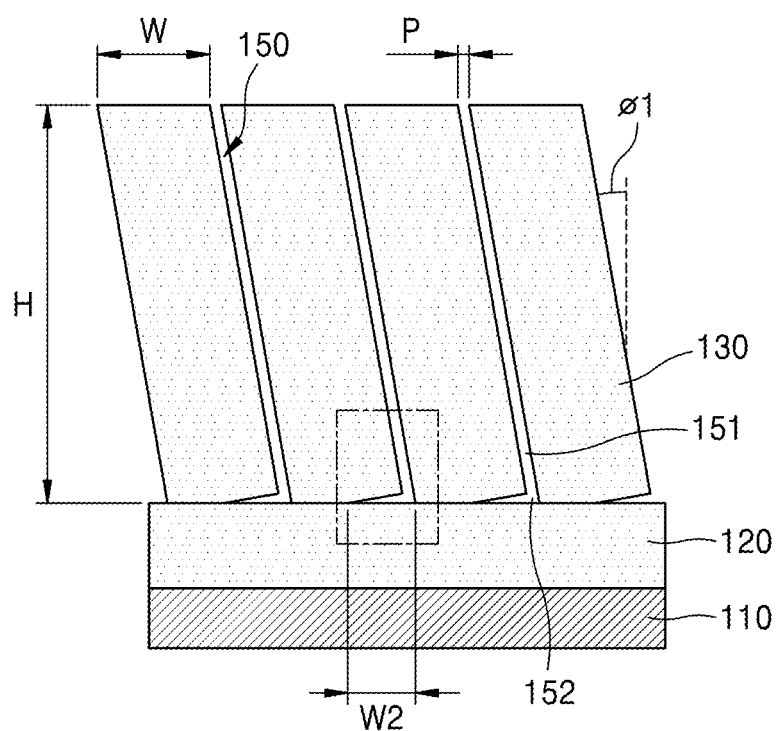
FIG. 2 is a cross-sectional view of the electrode structure shown in FIG. 1.
Figure 3:
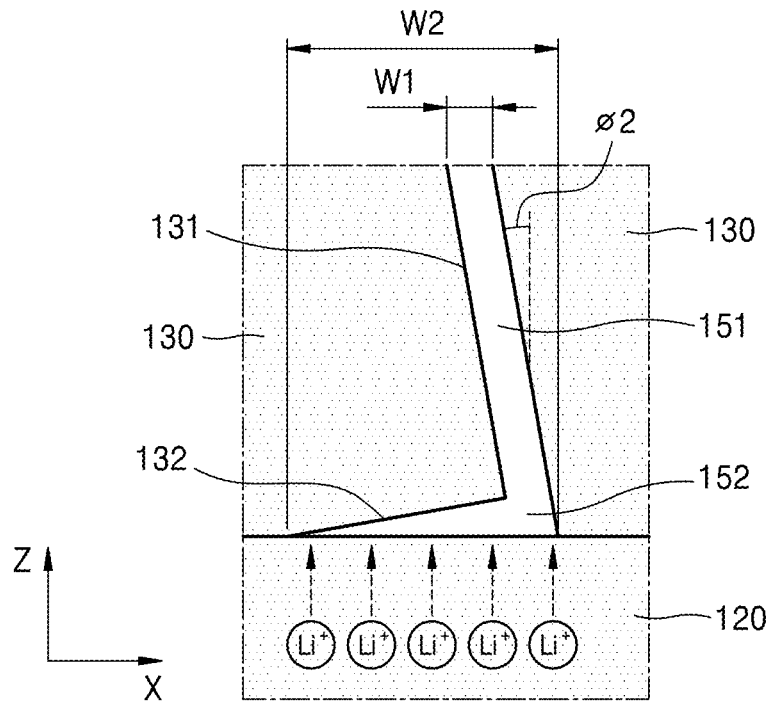
FIG. 3 is a diagram illustrating movement of lithium ions in a base layer of the electrode structure of FIG. 2.
Figure 4:
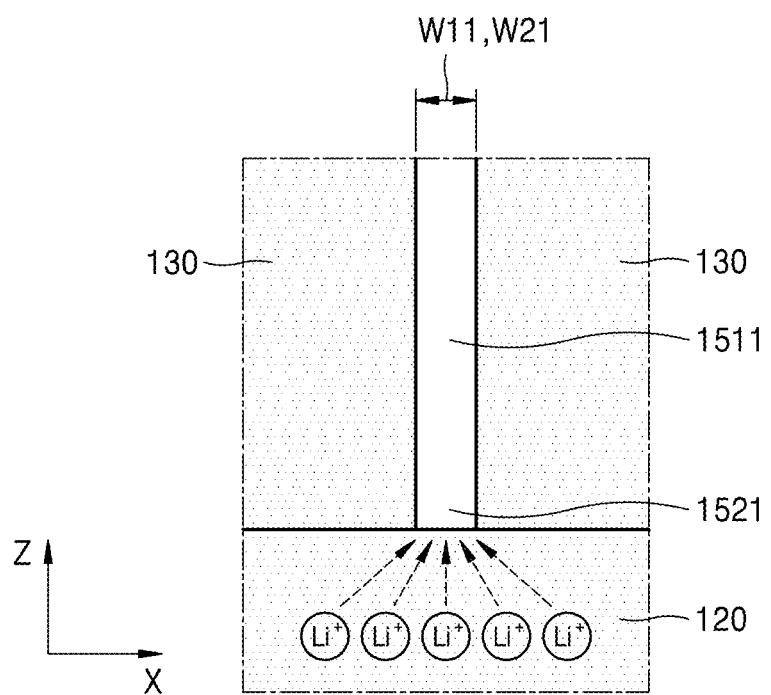
FIG. 4 is a diagram illustrating movement of lithium ions in the base layer of an electrode structure according to a Comparative Example.

FIG. 1 is a perspective view illustrating an electrode structure 100 according to an embodiment. FIG. 2 is a cross-sectional view of the electrode structure 100 shown in FIG. 1. FIG. 3 is a diagram illustrating movement of lithium ions in a base layer 120 of the electrode structure 100 of FIG. 2. FIG. 4 is a diagram illustrating movement of lithium ions in the base layer 120 of the electrode structure according to a Comparative Example.

Referring to FIGS. 1 and 2, the electrode structure 100 includes an electrode collector layer 110, the base layer 120 provided on the electrode collector layer 110, and a plurality of active material plates 130 provided on the base layer 120. The electrode structure 100 may be, for example, a cathode structure of a lithium secondary battery. The electrode structure 100 may have a three-dimensional structure. The electrode structure 100, e.g., the base layer 120, and the plurality of active material plates 130, may define a width direction, a longitudinal direction, and a height direction. In FIG. 1, each of the width direction, the longitudinal direction, and the height direction corresponds to an X-axis direction, a Y-axis direction, and a Z-axis direction, respectively.

The electrode collector layer 110 may be, for example, a positive electrode collector layer. The electrode collector layer 110 may comprise a conductive metal. For example, the electrode collector layer 110 may comprise Cu, Au, Pt, Ag, Zn, Al, Mg, Ti, Fe, Co, Ni, Ge, In, Pd, but is not limited thereto.

The base layer 120 may be provided on an upper surface of the electrode collector layer 110. The base layer 120 may include a first active material.

The plurality of active material plates 130 may be spaced apart from an upper surface of the base layer 120. The active material plate 130 may include a second active material.

The first and second active materials may include, for example, a cathode active material. Here, the first and second active materials may be the same material or different materials. The first and second active materials may each independently comprise, for example, lithium cobalt oxide ($LiCoO_2$), lithium nickel cobalt manganese oxide ($Li[Ni,Co,Mn]O_2$), lithium nickel cobalt aluminum oxide ($Li[Ni,Co,Al]O_2$), lithium manganese oxide ($LiMn_2O_4$), lithium iron phosphate ($LiFePO_4$) or a combination thereof, but are not limited thereto.

The base layer 120 may have a height of, for example, about 5 micrometers (μm) to about 200 μm. For example, the base layer 120 may have a height of about 7 μm to about 150 μm, or about 10 μm to about 50 μm, but is not limited thereto. The height of the base layer 120 may be less than the width of the active material plate 130.

The base layer 120 may be manufactured by a sintering process as described below, and thus the base layer 120 may not include a binder and a conductive material.

The plurality of active material plates 130 may be spaced apart from the upper surface of the base layer 120, thereby forming a three-dimensional electrode structure 100. The plurality of active material plates 130 may be spaced apart from each other by a distance P along a width direction on the upper surface of the base layer 120. For example, the plurality of active material plates 130 may be provided so as to be spaced apart from each other by the distance P approximately 0 micrometers to about 50 μm, about 2 μm to about 40 μm, or about 4 μm to about 30 μm, in the width direction. However, this is only exemplary.

Each of the plurality of active material plates 130 may have an aspect ratio of greater than 1. That is, the active material plate 130 may have a height H greater than a width W. For example, the width W of the active material plate 130 may be approximately 10 μm to about 200 μm, about 15 μm to about 175 μm, or about 5 μm to about 150 μm and the height H of the active material plate 130 may be approximately 20 μm to about 1000 μm, about 30 μm to about 900 μm, or about 40 μm to about 800 μm. For example, the height H of the active material plate 130 may be about 2 times to about 200 times the width W of the active material plate 130, but is not limited thereto.

In an embodiment, each plate of the plurality of active material plates 130 may have a same length, but are not limited thereto. For example, two or more plates of the plurality of active material plates 130 may have different lengths.

As described above, the plurality of active material plates 130 may be spaced apart from each other by the distance P on the upper surface of the base layer 120 such a channel 150 may be formed between the active material plates 130. The channel 150 may be filled with an electrolyte of a secondary battery.

The active material plate 130 may be obliquely disposed on the base layer 120. The active material plate 130 may have an inclination with respect to the height direction. An inclination angle $\phi 1$ with respect to the height direction of the active material plate 130 may be about 10 degrees to about 40 degrees, about 15 degrees to about 35 degrees, or about 20 degrees to about 30 degrees.

A plate of the plurality of active material plates 130 may comprise a side wall 131 and a lower wall 132. The lower wall 132 may contact the base layer 120. In an embodiment, the side wall 131 is perpendicular to the lower wall 132.

The channel 150 disposed between obliquely disposed active material plates 130 includes a first channel region 151 and a second channel region 152. A cross-sectional shape of the channel 150 may be an 'L' shape, a 'T' shape, or a 'y' shape.

The first channel region 151 may be defined by adjacent side walls 131 of the plurality of active material plates 130. A width W1 of the first channel region 151 may be about 0.5 μm to about 5 μm, about 1 μm to about 4 μm, or about 1.5 μm to about 3 μm. The width W1 of the first channel region 151 may be about 1/500 to about 1/10, about 1/450 to about 1/20, or about 1/400 to about 1/30 of the height H of an active material plate 130.

The width W1 of the first channel region 151 may be constant even when a position is changed in the height direction. However, the width W1 of the first channel region 151 is not limited to this, and may vary according to the position in the height direction.

The first channel region 151 may have an inclination with respect to the height direction. An inclination angle φ2 with respect to the height direction of the first channel region 151 may be about 10 degrees to about 40 degrees, about 15 degrees to about 35 degrees, or about 20 degrees to about 30 degrees.

The second channel region 152 may be connected to the first channel region 151 and may be defined by a lower wall 132 of the adjacent active material plates 130 and the base layer 120. A portion of the second channel region 152 may be disposed between the active material plate 130 and the base layer 120.

A cross-sectional shape of the second channel region 152 may be triangular.

A width W2 of the second channel region 152 may be greater than the width W1 of the first channel region 151. The width W2 of the second channel region 152 may be about 2 times to about 100 times, about 4 times to about 90 times, or about 8 times to about 80 times the width W1 of the first channel region 151. The width W2 of the second channel region 152 may be less than the width W of the active material plate 130.

The width W2 of the second channel region 152 may be about 5 μm to about 50 μm, about 10 μm to about 45 μm, or about 15 μm to about 40 μm.

When the width W2 of the second channel region 152 is greater than the width W1 of the first channel region 151, a width of the base layer 120 facing the second channel region 152 can widen. The base layer 120 may be exposed to more electrolyte than the base layer 120 having a structure in which a width W21 of a second channel region 1521 (see FIG. 4) is the same as a width W11 of a first channel region 1511 (see FIG. 4). Accordingly, when the secondary battery is charged, positive ions included in the base layer 120, for example, lithium ions, easily move along the channel 150.

Referring to FIG. 3, since the width W2 of the second channel region 152 is greater than the width W1 of the first channel region 151 in the electrode structure 100 according to the embodiment, lithium ions may easily move from the base layer 120 toward the second channel region 152 during charge of the secondary battery. As described above, lithium ions may be smoothly diffused, e.g., with reduced concentration polarization, through the second channel region 152, and thus the ion conductivity of the electrode structure 100 may be improved.

To the contrary, referring to FIG. 4, when the width W21 of the second channel region 1521 is the same as the width W11 of the first channel region 1511, as in the electrode structure according to the comparative example, lithium ions may not easily move from the base layer 120 toward the second channel region 1521 during charge of the secondary battery. As described above, due to a movement resistance of lithium ions in the base layer 120, a specific capacity per unit weight is reduced even though an active material density of the base layer 120 increases.

While not wanting to be bound by theory, it is understood that when lithium ions do not easily move from the base layer 120 toward the second channel region 1521, concentration polarization of lithium ions at a surface of the active material plate 130 may occur, which may result in deterioration of the surface of the active material plate 130, thereby reducing a lifespan of the electrode structure.

However, since lithium ions are smoothly diffused through the second channel region 152 in the electrode structure 100 according to the embodiment, e.g., with reduced concentration polarization, deterioration of the surface of the active material plate 130 may be reduced, thereby improving the lifespan of the electrode structure 100.

Also, in an embodiment, the width W2 of the second channel region 152 is greater than the width W1 of the first channel region 151 in the electrode structure 100, thereby preventing the movement resistance of lithium ions from increasing in the base layer 120, and thus the specific capacity may increase while the active material density of the base layer 120 increases.

The base layer 120 may have the same or a greater active material content as compared with the active material plate 130.

For example, a volume fraction of the first active material, which is a ratio of the first active material in the base layer 120 relative to the total volume of the base layer 120, may be about 65% to about 100%, about 70% to about 95%, or about 75% to about 90%. For example, the volume fraction of the first active material, may be about 70% to about 90%, or about 80% to about 100%. Also, a volume fraction of the second active material, which is a ratio of the second active material in the active material plate 130 relative to a total volume of the active material plate 130, may be about 65% to about 100%. For example, the volume fraction of the second active material, which is the ratio of the second active material in the active material plate 130 relative to the total volume of the active material plate 130, may be about 80% to about 100%. However, the content of the first active material in the base layer 120 and the content of the second active material in the active material plate 130 are not limited thereto.

FIGS. 5A to 11 are diagrams illustrating a method of manufacturing an electrode structure 200 according to an embodiment.

Figure 5A:
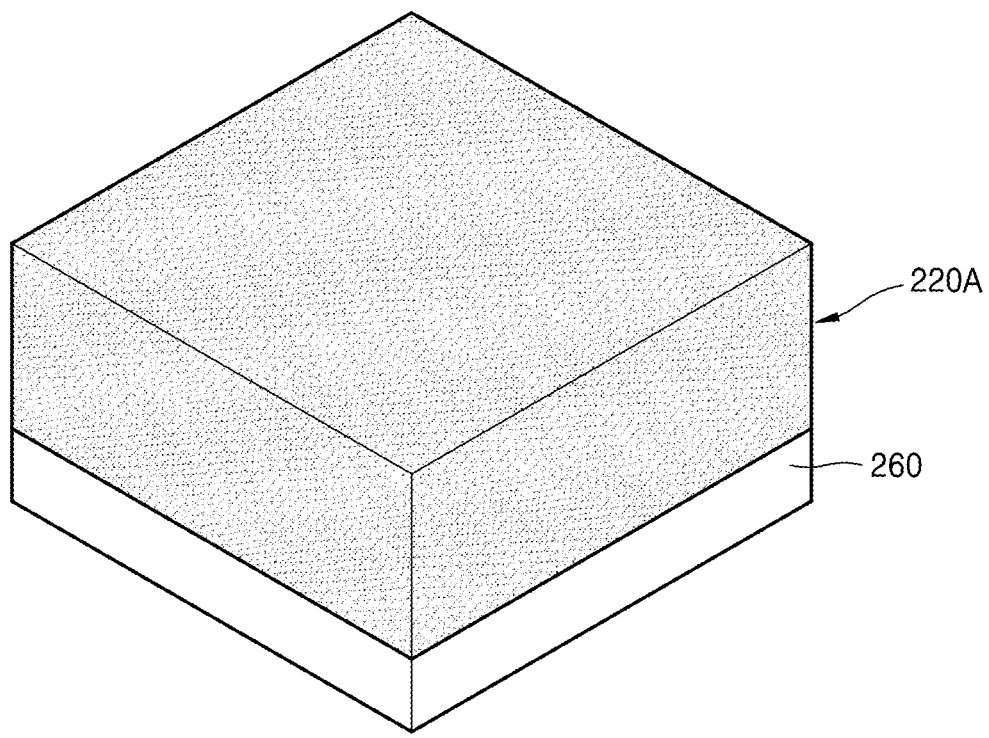
FIGS. 5A, 5B, 6A, 6B, 6C, and 6D are diagrams of an embodiment of a method of manufacturing an electrode structure.

Referring to FIG. 5A, a first active material film 220A is formed on a carrier 260. For the carrier 260, for example, a flexible film such as a polyethylene terephthalate (PET) film may be used, but is not limited thereto.

The first active material film 220A may be formed by a tape casting method, for example.

Figure 5B:
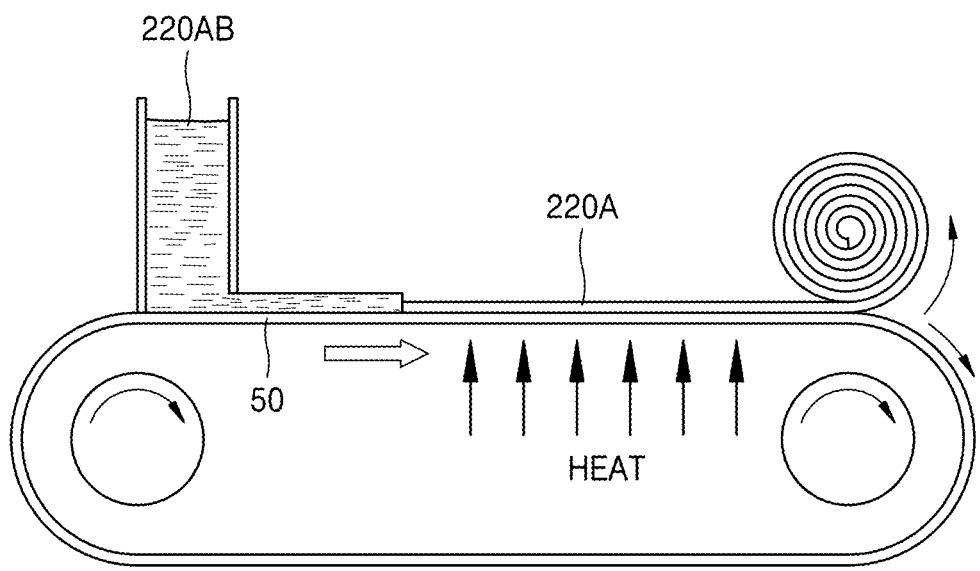

FIG. 5B illustrates an exemplary method of forming the first active material film 220A by the tape casting method.

Referring to FIG. 5B, an active material slurry 220AB is prepared by mixing an active material powder, a dispersing agent, a binder, a plasticizer, and a solvent to form an active material slurry. Subsequently, the active material slurry 220AB is applied to a moving belt 50. Here, the active material slurry 220AB may be applied with a uniform thickness by using, for example, a doctor blade. Next, the active material slurry 220AB is dried by heating to form the first active material film 220A. In the first active material film 220A, an active material powder is bonded by the binder. The active material powder is for forming an active material plate 230 that will be described later, and may include a second active material that is a positive electrode active material.

The first and second active materials may each independently include, for example, lithium cobalt oxide ($LiCoO_2$), lithium nickel cobalt manganese oxide ($Li[Ni,Co,Mn]O_2$), lithium nickel cobalt aluminum oxide ($Li[Ni,Co,Al]O_2$), lithium manganese oxide ($LiMn_2O_4$), lithium iron phosphate ($LiFePO_4$) or a combination thereof, but are not limited thereto.

Figure 6A:
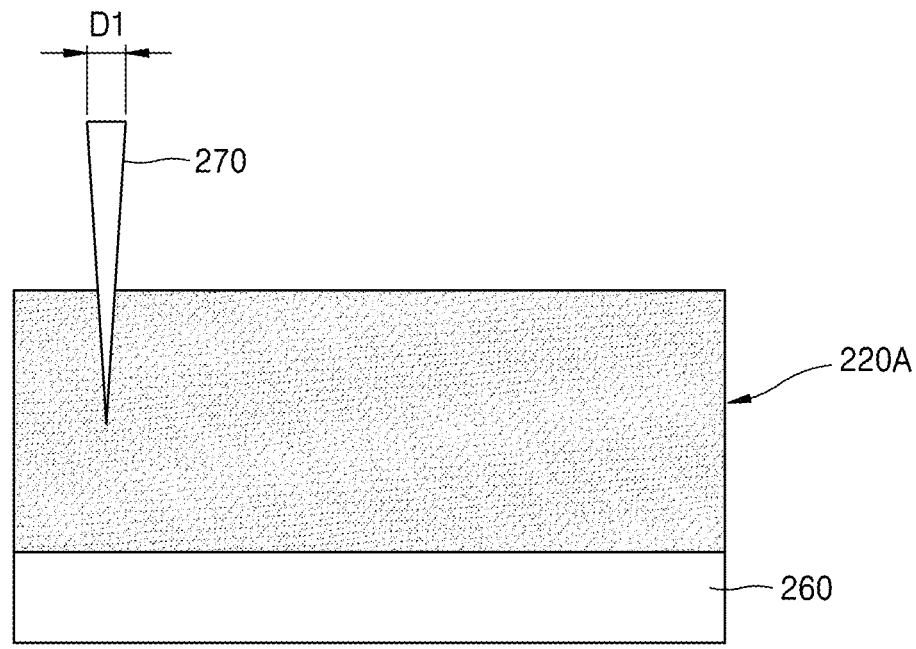

Then referring to FIGS. 6A to 6D, a plurality of channel regions 251 are formed in the first active material film 220A through a blade stamping process. Specifically, as shown in FIG. 6A, a blade 270 is inserted into the first active material film 220A by applying pressure to the blade 270 having a width D1. The blade 270 may be inserted into the first active material film 220A until an end of the blade 270 is in contact with the carrier 260.

Figure 6B:
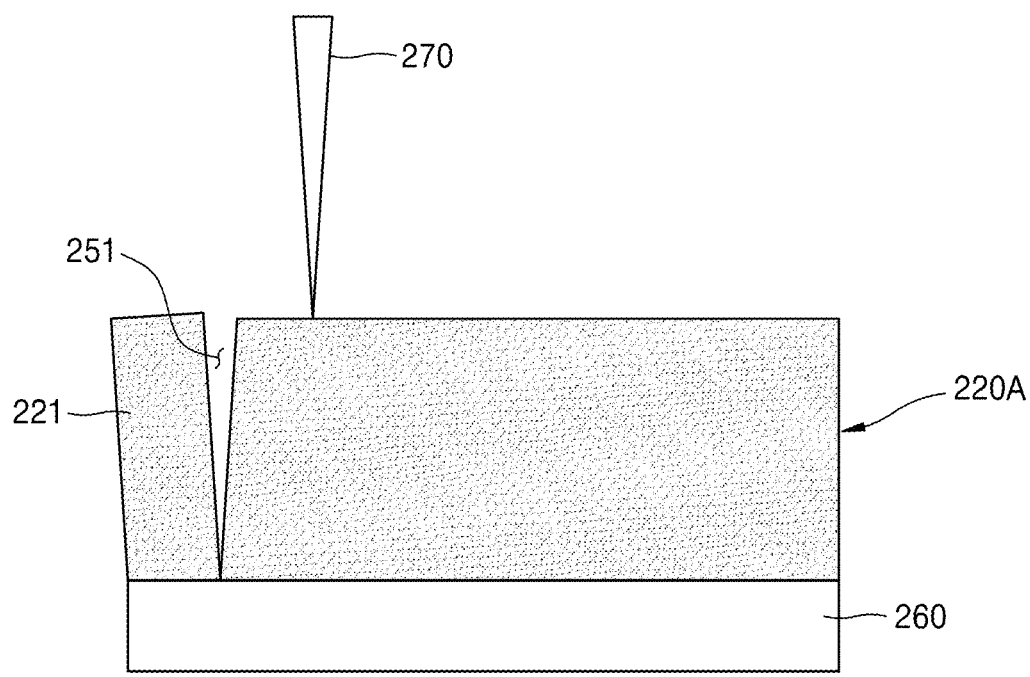

Then referring to FIG. 6B, when the blade 270 inserted into the first active material film 220A is pulled out, the first channel region 251 may be formed in the first active material film 220A.

Figure 6C:
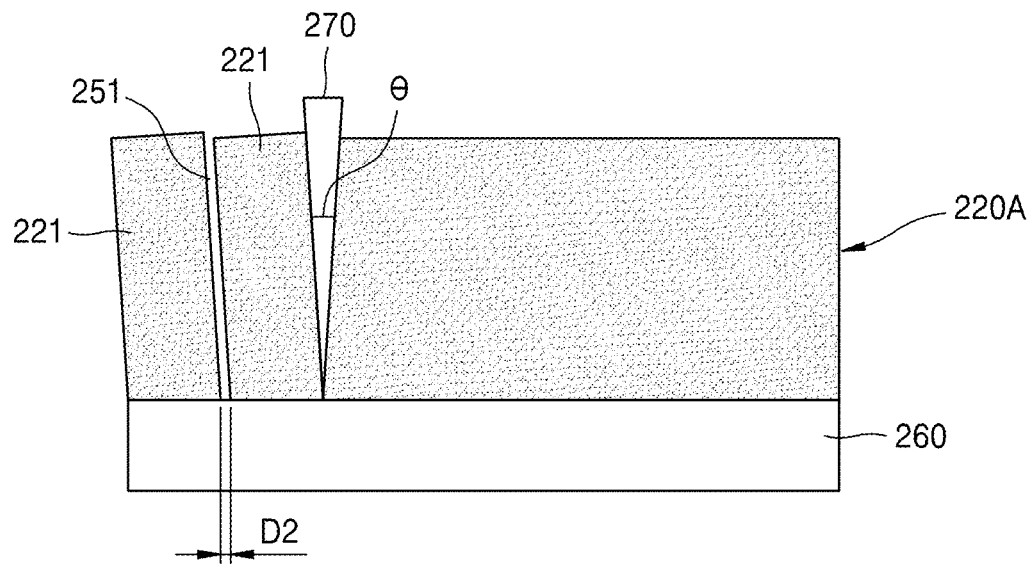
Figure 6D:
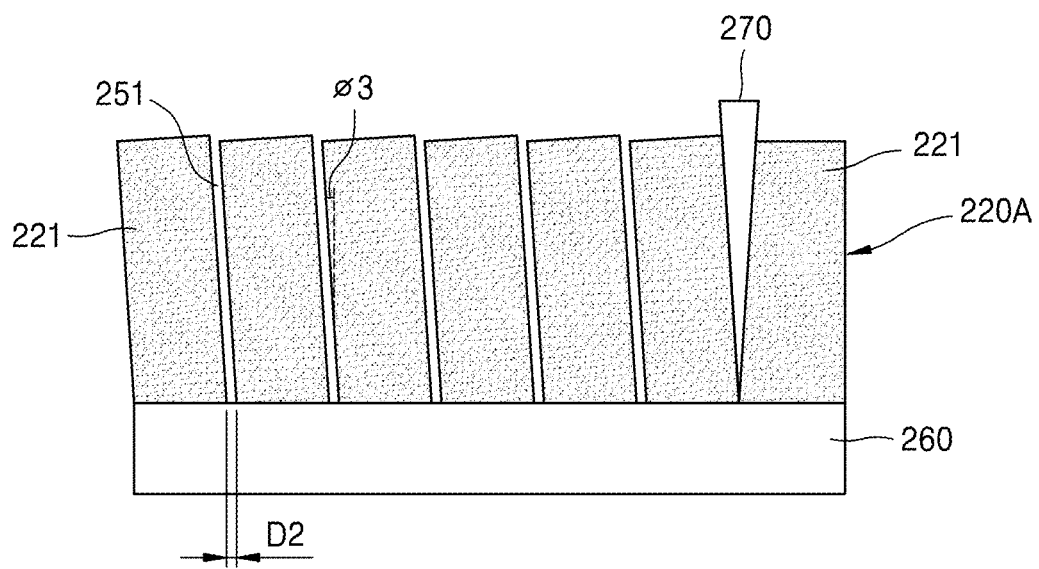

As shown in FIGS. 6C to 6D, in a process for forming the channel region 251 by inserting the blade 270 into the first active material film 220A, a portion 221 of the first active material film 220A located in a side of the channel region 251 may be tilted on the carrier 260. The channel region 251 may have a width D2 less than a width D1 of the blade 270 as the portion 221 of the first active material film 220A located around the channel region 251 is tilted on the carrier 260.

By appropriately selecting a shape and a thickness of the blade 270, after the blade 270 is removed, in spite of an elasticity restoring force of the first active material film 220A, a state where the portion 221 of the active material film 220A, located in the side of the channel region 251, is disposed on the carrier 260, may be maintained. Since the portion 221 of the first active material film 220A is in a disposed state, the channel region 251 disposed therebetween may also have a height direction and an inclination. For example, the inclination angle $\phi 3$ with respect to the height direction of the first channel region 251 may be about 10 degrees to about 40 degrees, about 15 degrees to about 35 degrees, or about 20 degrees to about 30 degrees.

For example, the blade 270 may have a thickness. For example, the thickness D1 of the blade 270 inserted into the first active material film 220A may be about 50 times to about 200 times, about 60 times to about 175 times, or about 70 times to about 150 times the width W1 of the first channel region 251 of the electrode structure 200. For example, when the width W1 of the first channel region 251 is about 1 μm, the thickness D1 of the blade 270 may be about 100 μm.

The end of the blade 270 may have a pointed shape. An angle $\phi$ of the end of the blade 270 may be about 10 degrees to about 30 degrees, about 12 degrees to about 28 degrees, or about 15 degrees to about 20 degrees.

Figure 7:
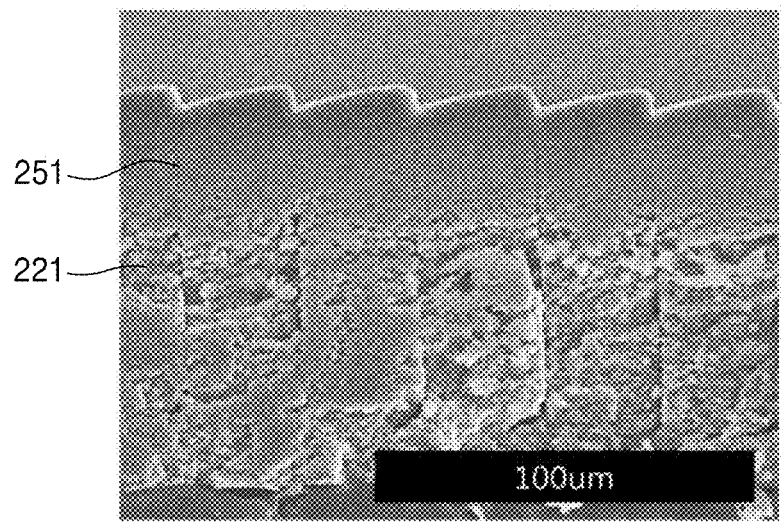
FIGS. 7 and 8 are scanning electron microscope (SEM) images of an embodiment of an electrode structure.
Figure 8:
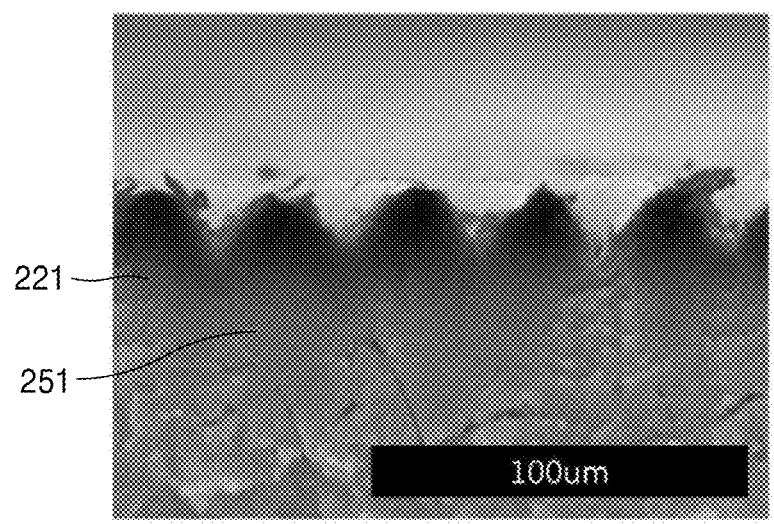

A degree to which the first active material film 220A is disposed on the carrier 260 and the inclination angle of the first channel region 251 may vary depending on the thickness D1 of the blade 270 or the angle $\theta$ of the end of the blade 270. For example, when the thickness D1 of the blade 270 is relatively small or the angle $\theta$ of the end of the blade 270 is small, the channel region 251 formed in the first active material film 220A may have a gentle slope with respect to a height direction as shown in FIG. 7. For example, when the thickness D1 of the blade 270 is relatively large or the angle $\theta$ of the end of the blade 370 is large, the channel region 251 formed in the first active material film 220A may have a steep inclination with respect to a high direction as shown in FIG. 8.

Figure 9A:
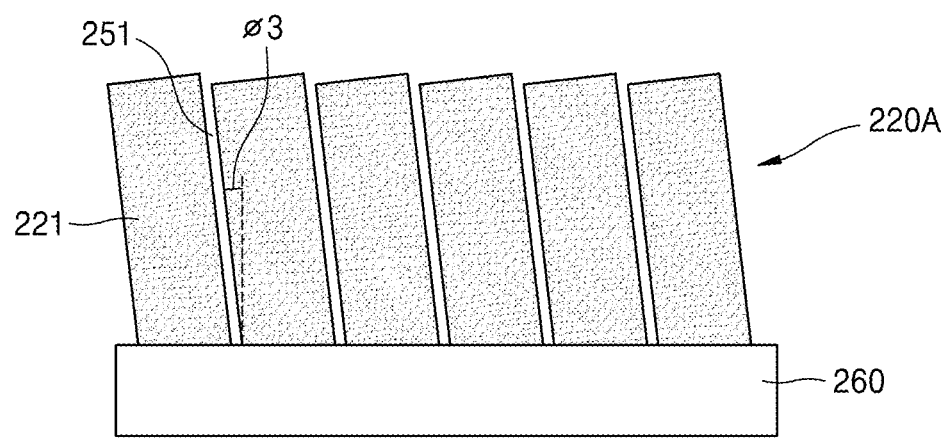
FIGS. 9A to 9D are diagrams of an embodiment of a method of manufacturing an electrode structure.

Referring to FIG. 9A, the plurality of channel regions 251 may have an inclination with respect to the height direction by a blade stamping process using the blade 270. An upper surface of the first active material film 220A on which the plurality of first channel regions 251 are formed does not have a flat shape and may have a zigzag shape.

Figure 9B:
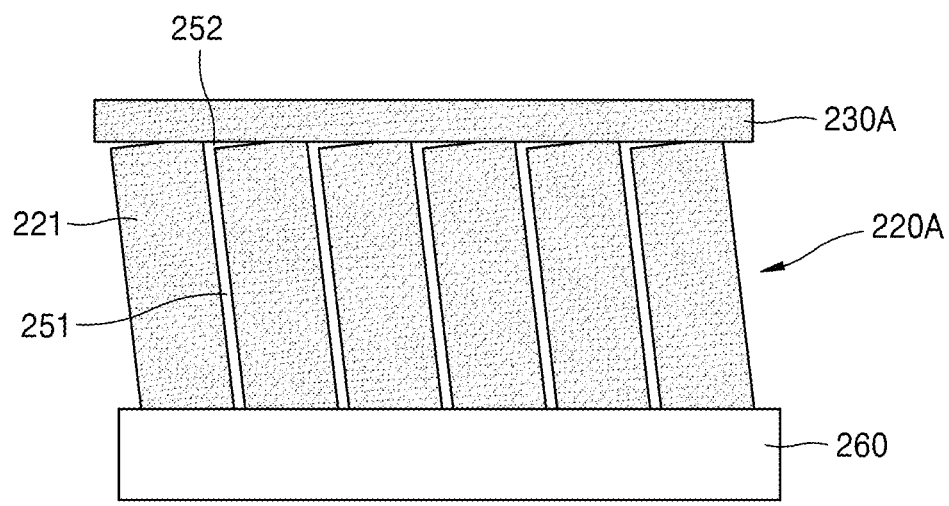

Referring to FIG. 9B, a second active material film 230A including a first active material is disposed on the upper surface of the first active material film 220A in which the plurality of first channel regions 251 are formed.

The second active material film 230A is a film of a flat shape, and is formed separately from the first active material film 220A. In the second active material film 230A, active material powders are bonded by a binder. The active material powder is for forming the base layer 220 described later, and may include the first active material, for example, a positive electrode active material.

A second channel region 252 is formed between the upper surface of the first active material film 220A and the second active material film 230A since the upper surface of the first active material film 220A is not entirely flat.

A width of the second channel region 252 is greater than a width of the first channel region 251. The width of the second channel region 252 may be about 2 times to about 100 times, about 4 times to about 90 times, or about 8 times to about 80 times, the width of the first channel region 251.

The second active material film 230A may be bonded to the first active material film 220A in a state where the second active material film 230A is disposed on the upper portion of the first active material film 220A. The first active material film 220A in which the first channel region 251 is formed may be bonded to the second active material film 230A by a warm isostatic press.

After the second active material film 230A is bonded to the first active material film 220A, the carrier film 260 may be removed.

Figure 9C:
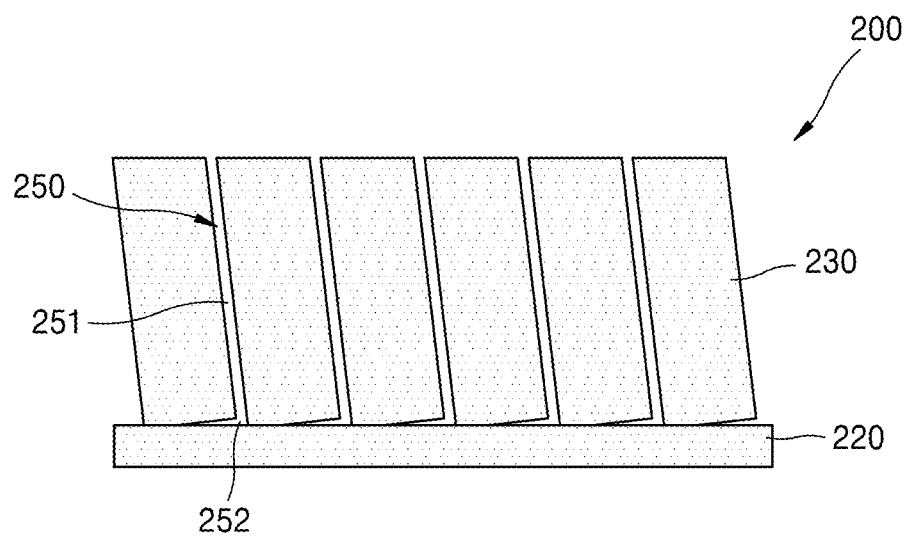

Referring to FIG. 9C, postures of the first active material film 220A and the second active material film 230A are changed such that the second active material film 230A is positioned in a lower portion of the first active material film 220A.

A sintering process may be performed on the first active material film 220A and the second active material film 230A such that the electrode structure 200 including the base layer 220, the plurality of active material plates 230, and the channel 250 may be manufactured according to the embodiment.

The sintering process may be performed by heat-treating the first active material film 220A and the second active material film 230A at a suitable temperature and time. Through this sintering process, the binder included in the first active material film 220A and the second active material film 230A may be removed. Accordingly, the plurality of active material plates 230 including the second active material may be formed by removing the binder included in the first active material film 220A, and the base layer 220 including the first active material may be formed by removing the binder included in the second active material film 230A.

The first active material film 220A and the second active material film 230A may be contracted by the sintering process as described above and thus the width of the first channel region 251 formed between the plurality of active material plates 230 may be less than the width of the first channel region 251 formed through the blade stamping process described above.

Figure 9D:
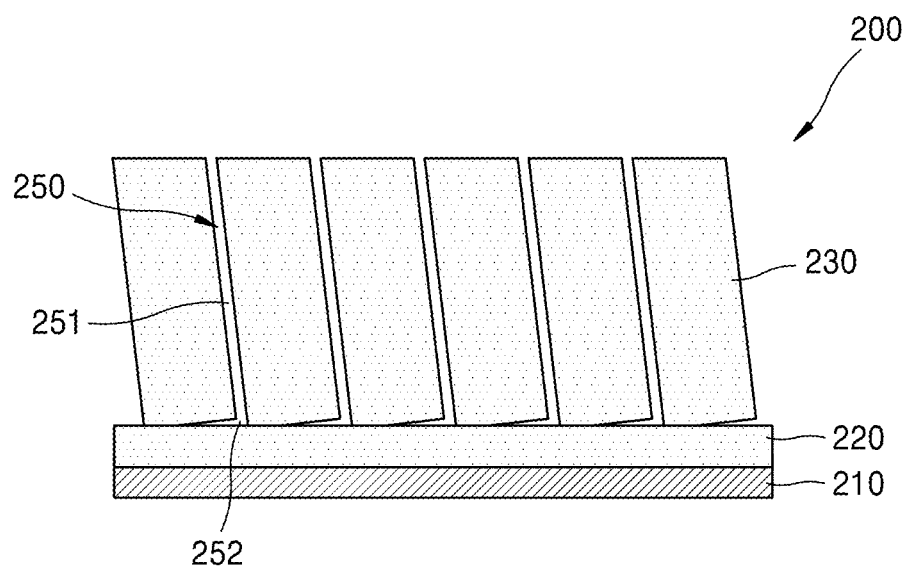

Finally, referring to FIG. 9D, an electrode current collector layer 210 is formed on a lower surface of the base layer 220. For example, the electrode current collector layer 210 may be formed on the lower surface of the base layer 220 by depositing a current collecting material such as Al, Ni or the like using, for example, sputtering or the like.

Figures 10A, 10B:
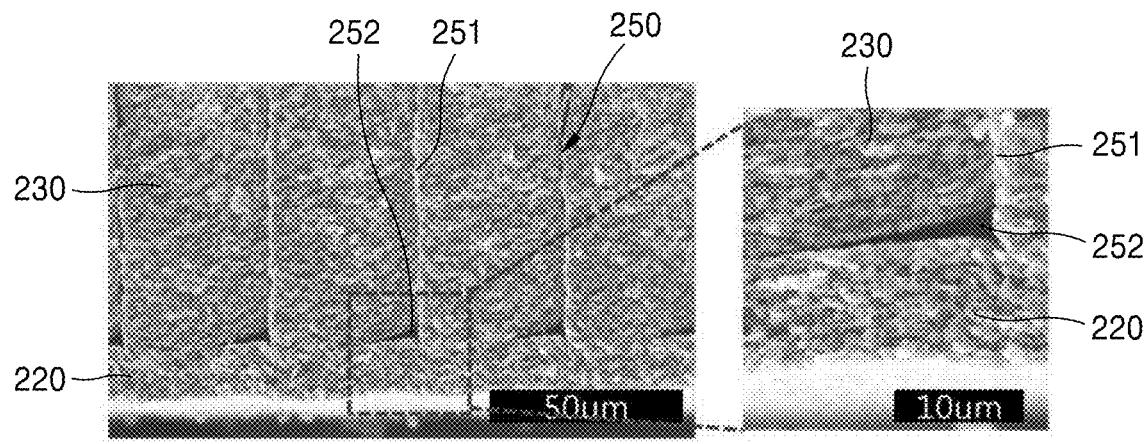
Figure 11:
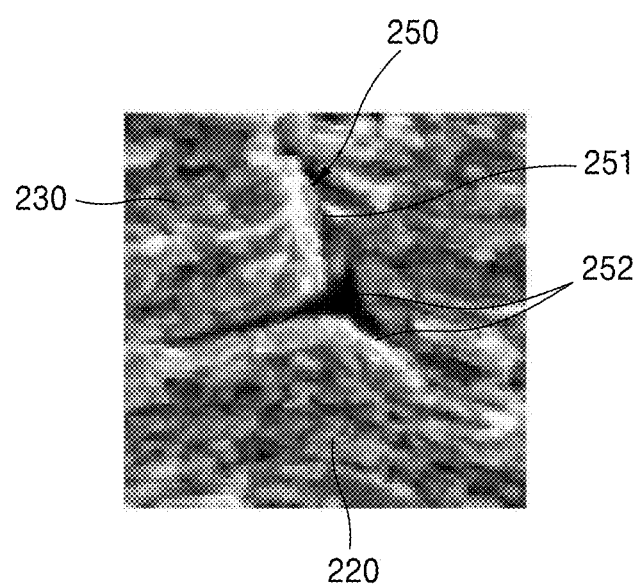

FIGS. 10A, 10B, and 11 are Scanning Electron Micrographs (SEM) of the base layer 220 and the plurality of active material plates 230 formed by the manufacturing process shown in FIGS. 9A to 9D. FIG. 10B is an enlarged view of a portion of FIG. 10A and shows the second channel region 252 and a portion adjacent thereto according to an embodiment. FIG. 11 is an enlarged view of the second channel region 252 and a portion adjacent thereto according to another embodiment. Here, both the base layer 220 and the plurality of active material plates 230 used lithium cobalt oxide as an active material.

Referring to FIGS. 10A and 10B, a width of the first channel region 251 is about 1 µm or less, while a width of the second channel region 252 was measured to be 10 µm or more. Also, it may be seen that as the active material plate 230 has a gentle inclination with respect to the height direction, the first channel region 251 has a gentle inclination with respect to the height direction. Accordingly, it may be seen that the channel 250 including the first channel region 251 and the second channel region 252 has an 'L' shape.

Referring to FIG. 11, it may be seen that as the active material plate 230 has a steep inclination with respect to the height direction, the first channel region 251 has a steep inclination with respect to the height direction. Accordingly, it may be seen that the channel 250 including the first channel region 251 and the second channel region 252 has a 'T' shape or a 'y' shape. During the bonding or sintering process, it may be seen that the base layer 220 and the active material plate 230 are somewhat partially crushed.

Figure 12:
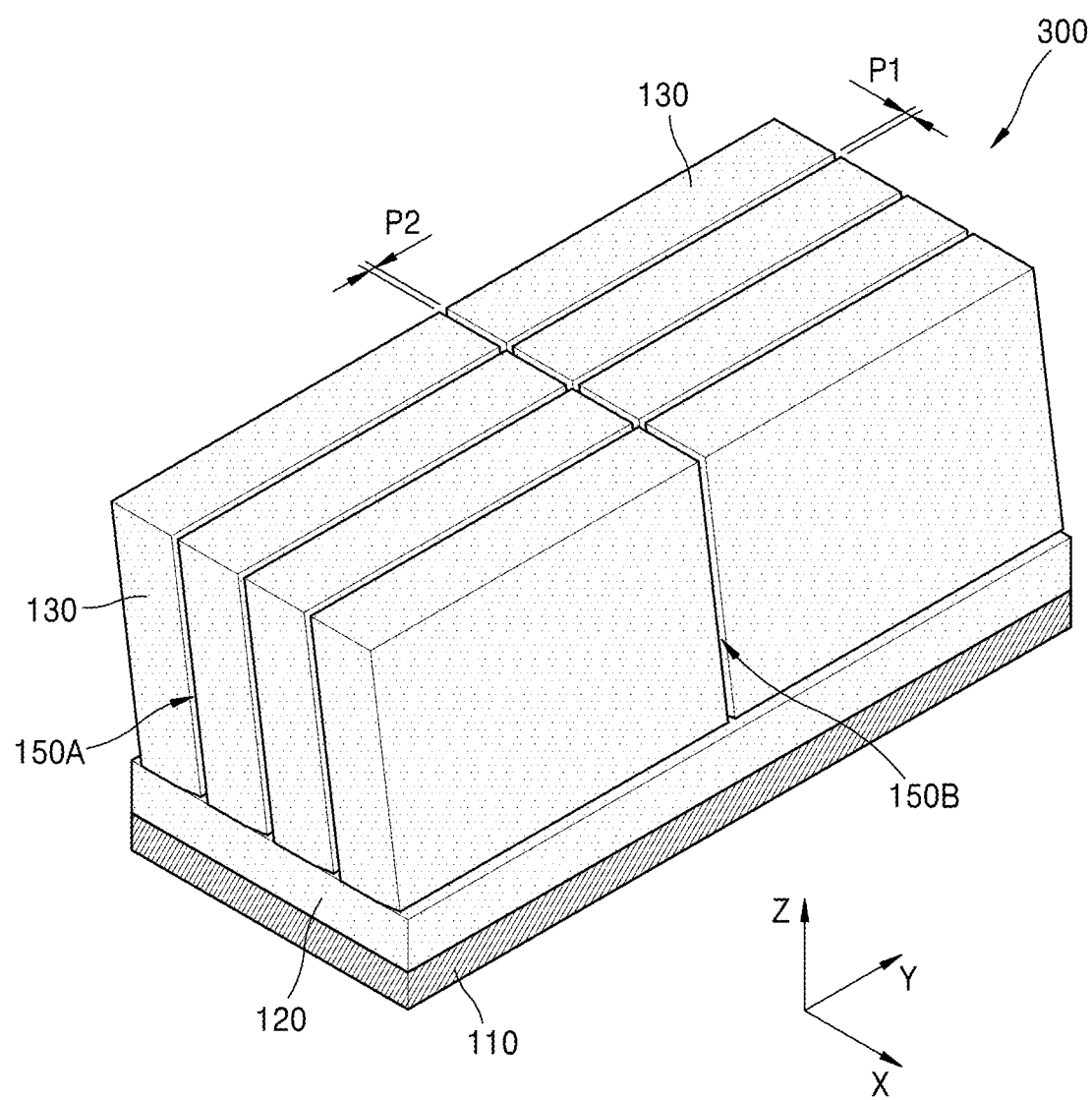
FIG. 12 is a perspective view showing an embodiment of an electrode structure.

FIG. 12 is a perspective view of an embodiment of an electrode structure 300. The electrode structure 300 shown in FIG. 12 is the same as the electrode structure 100 shown in FIG. 1 except that a plurality of active material plates 130 are spaced apart in a longitudinal direction (Y-axis direction).

Referring to FIG. 12, the base layer 120 is provided on an upper surface of the electrode collector layer 110, and the plurality of active material plates 130 are spaced apart from each other on an upper surface of the base layer 120. Here, the plurality of active material plates 130 are spaced apart from each other by a first interval P1 in a width direction (X-axis direction) and spaced apart from each other by a second interval P2 in a longitudinal direction (Y-axis direction).

The first channel 150A may be formed between the active material plates 130 spaced apart in the width direction and the second channel 150B may be formed between the active material plates 130 spaced apart in the longitudinal direction. The first and second channels 150A and 150B, respectively, include the first channel region 151 and the second channel region 152 having the width W2 greater than the width W1 of the first channel region 151.

Here, widths of the first and second channels 150A and 150B, respectively, may be greater than 0 and less than or equal to 50 µm, but are not limited thereto, and may be, for example, about 1 µm to about 45 µm, about 2 µm to about 40 µm. Also, a shape of the first and second channels 150A and 150B, respectively, may each independently be varied. Each plate 130 in the plurality of active material plates 130 may have the same length, but are not limited thereto. For example, two or more plates 130 of the plurality of active material plates 130 may have different lengths.

Figure 13:
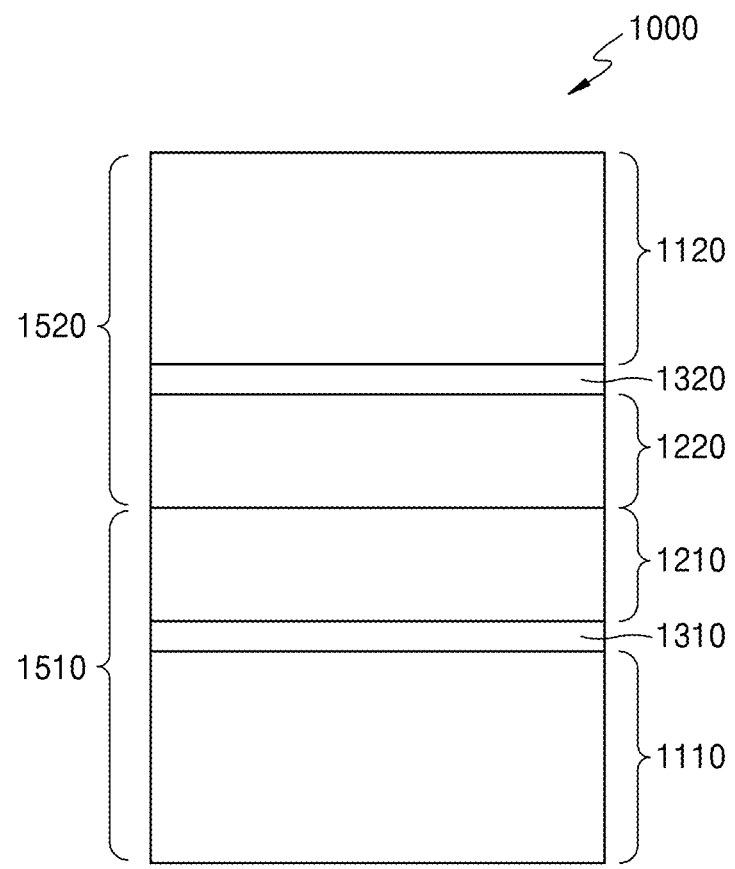
FIG. 13 is a cross-sectional view of an embodiment of a secondary battery.

FIG. 13 is a cross-sectional view of an embodiment of a secondary battery 1000.

Referring to FIG. 13, the secondary battery 1000 may have a structure in which a plurality of unit structures 1510 and 1520 are stacked. FIG. 13 shows an embodiment in which the secondary battery 1000 includes a structure in which the two first and second unit structures 1510 and 1520, respectively, are stacked.

The first unit structure 1510 includes a first electrode structure 1110, a separation membrane 1310 provided on an upper surface of the first electrode structure 1110 and a second electrode structure 1210 provided on an upper surface of the separation membrane 1310. Here, the first and second electrode structures 1110 and 1210, respectively, may be a cathode structure and an anode structure, respectively.

The first electrode structure 1110, which is the cathode structure, may be one of the electrode structures 100, 200, and 300 having a three-dimensional structure as described above. The first electrode structure 1110 is described above, and thus a detailed description thereof will be omitted.

The separation membrane 1310 is provided on the upper surface of the first electrode structure 1110. The second electrode structure 1210 is provided on an upper surface of the separation membrane 1310. The second electrode structure 1210, which is the anode structure, may include an anode collector layer (not shown) and an anode active material layer (not shown).

The anode collector layer may include a conductive metal. The anode active material layer may include an anode active material and a binder. A pore inside the anode active material layer may be filled with an electrolyte. The anode active material may include, for example, an anode active material having suitable electrical conductivity, such as lithium (Li) metal, silicon, carbon, an oxide, or a combination thereof, but is not limited thereto.

The second unit structure 1520 is stacked on an upper surface of the first unit structure 1510. The second unit structure 1520 includes a second electrode structure 1220, a separation membrane 1320 provided on an upper surface of the second electrode structure 1220, and a first electrode structure 1120 provided on an upper surface of the separation membrane 1320. Here, the first and second electrode structures 1120 and 1220, respectively, are the same as the first and second electrode structures 1110 and 1210, respectively, of the first unit structure 1510 described above. Accordingly, the first and second electrode structures 1120 and 1220, respectively, may be a cathode structure and an anode structure, respectively. Also, the anode collector layer of the first unit structure 1510 and an anode collector layer of the second unit structure 1520 may be integrally formed.

An embodiment in which the secondary battery 1000 includes a structure in which the two unit structures 1510 and 1520, respectively, are stacked is exemplarily described above, but is not limited thereto. The secondary battery 1000 may have a structure in which three or more unit structures are stacked.

EXAMPLES

Examples are conducted using electrode and battery structures as described above. Results are shown in FIGS. 14 to 16.

Figure 14:
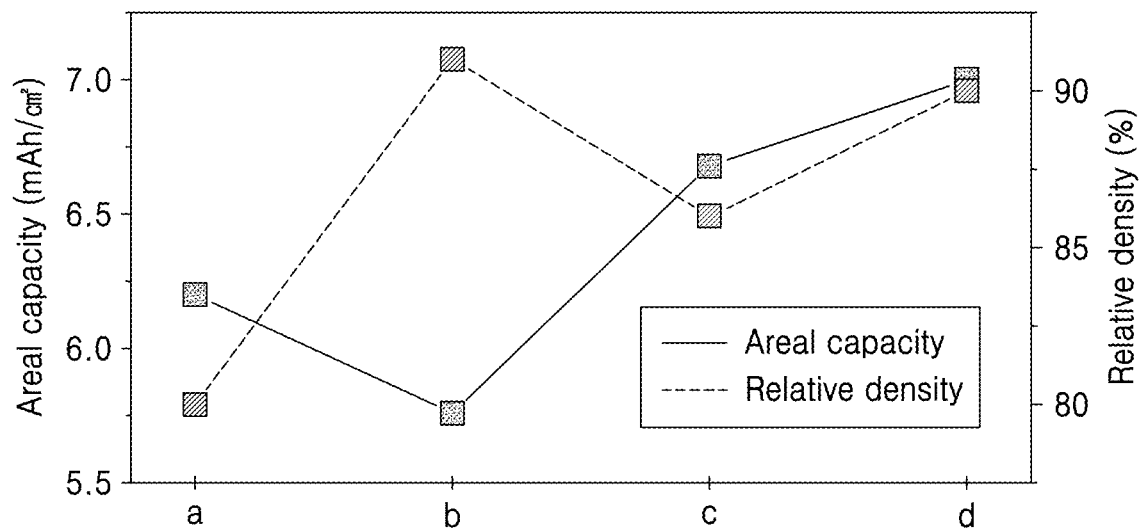
FIG. 14 is a graph of areal capacity (milliampere-hours per square centimeter, $mAh/cm^2$) and relative density (%) for components of an embodiment of an electrode structure.

FIG. 14 is a graph of areal capacity (milliampere-hours per square centimeter, mAh/cm$^2$) versus relative density (%) for components of an electrode structure 200. FIG. 15 is a graph of voltage (V) versus areal capacity (mAh/cm$^2$) for components of an electrode structure 200. A density of the active material plate 230, a density of the base layer 220, and a shape of the channel 250 were varied. In FIG. 14, a solid line represents capacity per unit area and a dotted line represents density.

Figure 15:
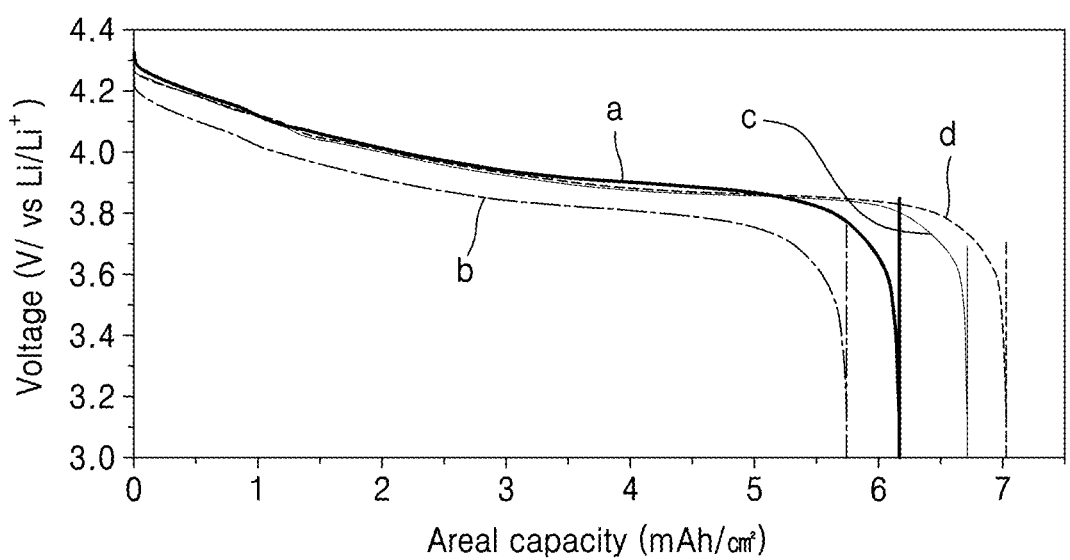
FIG. 15 is a graph of voltage (V versus $Li/Li^+$) versus areal capacity ($mAh/cm^2$) for components of an embodiment of an electrode structure, illustrating capacity per unit area according to a density of an active material plate, a density of a base layer, and a shape of a channel.
Figure 16:
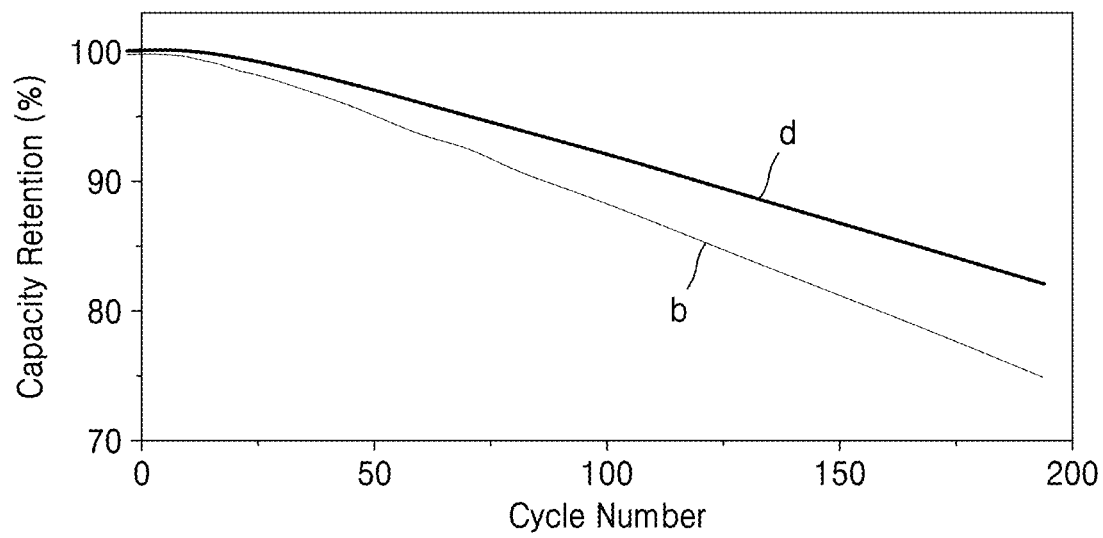
FIG. 16 is a graph of capacity retention (%) versus cycle number showing a lifespan of a secondary battery varying according to a shape of a channel of an electrode structure.

In FIGS. 14 and 15, Comparative Example "a" represents a result obtained using an electrode structure 200 having a channel 250 in which both an active material density of the active material plate 230 and an active material density of the base layer 220 are 80%, and widths of the first channel region 251 and the second channel region 252 are the same. The capacity per unit area of a secondary battery including the electrode structure 200 according to Comparative Example "a" was measured to be 6.2 mAh/cm$^2$.

In FIGS. 14 and 15, Comparative Example "b" represents a result obtained using an electrode structure 200 having a channel 250 in which both the active material density of the active material plate 230 and the active material density of the base layer 220 are 92%, and the widths of the first channel region 251 and the second channel region 252 are the same. The capacity per unit area of the secondary battery including the electrode structure 200 according to comparative example "b" was 5.7 mAh/cm$^2$. While not wanting to be bound by theory, it is understood that the primary reason why the capacity per unit area according to Comparative Example "b" is less than the capacity per unit area of Comparative Example "a," in which the active material density of the active material plate 230 and the active material density of the base layer 220 are less, is that according to the density increase of the base layer 230, it is difficult to impregnate the base layer 220 with an electrolyte, and thus a movement resistance of lithium ions, e.g., concentration polarization, in the second channel region 252 increases.

In FIGS. 14 and 15, Comparative Example "c" represents a result obtained using an electrode structure 200 having a channel 250 in which the active material density of the active material plate 230 is 92%, the active material density of the base layer 220 is 80%, and the widths of the first channel region 251 and the second channel region 252 are the same. In Comparative Example "c," an average active material density of the active material plate 230 and the base layer 220 is 86%. The capacity per unit area of the secondary battery including the electrode structure 200 according to Comparative Example "c" was 6.7 mAh/cm$^2$. While not wanting to be bound by theory, it is understood that the reason why the capacity per unit area according to Comparative Example "c" is greater than the capacity per unit area according to Comparative Examples "a" and "b" is that it is possible to impregnate the base layer 220 with the electrolyte by reducing the active material density of the base layer 220 while increasing the active material density of the active material plate 230.

In FIGS. 14 and 15, Example "d" represents a measurement result obtained using an electrode structure 200 having a channel 250 in which both the active material density of the active material plate 230 and the active material density of the base layer 220 are 90%, and the width of the second channel region 252 is greater than that of the first channel region 251. The capacity per unit area of the secondary battery including the electrode structure 200 according to example "d" was 7 mAh/cm$^2$. While not wanting to be bound by theory, it is understood that the reason why the capacity per unit area according to example "d" is greater than the capacity per unit area according to comparative example "c" is that an increase in the movement resistance of lithium ions of the base layer 220 is minimized by the second channel region 252 while the active material density of the base layer 220 increases.

FIG. 16 is a graph of lifespan of a secondary battery varied according to a shape of a channel 250 of an electrode structure 200. The graph displays capacity retention (%) versus cycle number for the electrode structure 200. In FIG. 16, "b" represents the lifespan of the secondary battery including the electrode structure 200 according to Comparative Example "b", and "d" represents the lifespan of the secondary battery including the electrode structure 200 according to Example "d". In the secondary battery according to Comparative Example "b" and example "d", except for the shape of the channel 250 of the electrode structure 200, other parameters are the same.

The lifespan of the secondary battery including the electrode structure 200 according to Comparative Example "b" and the lifespan of the secondary battery including the electrode structure 200 according to Example "d" show that the lifespan of the electrode structure 200 according to Example "d" is longer than the lifespan of the electrode structure 200 according to Comparative Example "b".

According to the above embodiments, since a base layer and active material plates constituting an electrode are formed through a sintering process, use of a binder or a conductive material in the base layer and the active material plates, for binding active materials or for improving the electrical conductivity, can be avoided or eliminated. Also, since the active material plates are provided on the base layer, so as to be spaced apart from each other to form a three-dimensional structure, a movement of lithium ions may be induced through an electrolyte having a high ion conductivity, and thus ion conductivity may be improved. When the ionic conductivity is improved, heights of the active material plates may increase, and thus a current density may be improved.

Also, since a width of a second channel region adjacent to the base layer in a channel is greater than a width of a first channel region, the ion conductivity may be improved by effectively inducing the movement of lithium ions toward the electrode collector layer in the base layer. By applying the electrode structure having the three-dimensional structure as described above, a secondary battery having improved energy density may be implemented.

According to an embodiment, an electrode structure, a method of manufacturing the electrode structure, and a secondary battery including the electrode structure may increase the width of the second channel region adjacent to the base layer in the channel disposed between a plurality of active material plates, and thus the movement of lithium ions toward the electrode collector layer in the base layer may be effectively induced, thereby improving the ion conductivity.

It should be understood that embodiments described herein should be considered in a descriptive sense only and not for purposes of limitation. Descriptions of features or aspects within each embodiment should typically be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. An electrode structure comprising:
a flat base layer comprising a first active material;
a plurality of active material plates, a plate of the plurality of active material plates comprising opposing side walls and a lower wall between the opposing side walls, wherein the lower wall is disposed on the base layer, wherein adjacent plates of the plurality of active material plates are spaced apart from each other, and wherein an active material plate of the plurality of active material plates comprises a second active material; and
a channel between adjacent plates of the plurality of active material plates, wherein the channel comprises
a first channel region defined by adjacent side walls of the adjacent plates, and
a second channel region connected to the first channel region and defined by a lower wall of the plate of the plurality of active material plates and the base layer,
wherein a width of the second channel region is greater than a width of the first channel region.

2. The electrode structure of claim 1, wherein the plurality of active material plates are disposed obliquely on the base layer.

3. The electrode structure of claim 2, wherein a lower wall of the plurality of active material plates and the base layer form an angle of about 10 degrees to about 40 degrees.

4. The electrode structure of claim 1, wherein the first active material and the second active material are different from each other.

5. The electrode structure of claim 1, wherein the first channel region has a height along a first direction, a width along a second direction perpendicular to the first direction, and a length in a third direction perpendicular to the first direction and the second direction, and wherein the first channel region has an inclination with respect to the first direction.

6. The electrode structure of claim 5, wherein an inclination angle of the first channel region with respect to the first direction is about 10 degrees to about 40 degrees.

7. The electrode structure of claim 1, wherein a volume fraction of the first active material with respect to a total volume of the base layer is greater than or equal to a volume fraction of the second active material with respect to a total volume of the plurality of active material plates.

8. The electrode structure of claim 1,
wherein a volume fraction of the first active material with respect to a total volume of the base layer is about 65% to about 100%, and
wherein a volume fraction of the second active material with respect to a total volume of the plurality of active material plates is about 65% to about 100%.

9. The electrode structure of claim 1, wherein a width of the second channel region is about 2 times to about 100 times a width of the first channel region.

10. The electrode structure of claim 1,
wherein a height of a plate in the plurality of active material plates is greater than a width of a plate of the plurality of active material plates, and
wherein a width of the first channel region is less than the width of a plate in the plurality of active material plates.

11. The electrode structure of claim 1, wherein each of the first and second active materials comprises a cathode active material.

12. A method of manufacturing the electrode structure of claim 1, the method comprising:
providing the base layer comprising a first active material film;
disposing a second active material film on a carrier;
forming the plurality of first channel regions in the second active material film;
forming the second channel region between the first active material film and the second active material film by disposing the first active material film on the second active material film; and
sintering the first active material film and the second active material film to form the plurality of active material plates on a surface of the base layer, and the channel between the plurality of active material plates to manufacture the electrode structure.

13. A secondary battery comprising:
a first electrode structure comprising the electrode structure of claim 1;
a second electrode structure adjacent to and spaced apart from the first electrode structure; and
a separation membrane disposed between the first electrode structure and the second electrode structure.

14. An electrode structure comprising:
a flat current collector layer;
a flat base layer comprising a first active material disposed on the flat current collector layer;
a plurality of active material plates, a plate of the plurality of active material plates comprising opposing side walls and a lower wall, wherein the lower wall is disposed on the base layer, wherein adjacent plates of the plurality of active material plates are spaced apart from each other, and wherein an active material plate of the plurality of active material plates comprises a second active material; and
a channel between adjacent plates of the plurality of active material plates, wherein the channel comprises
a first channel region defined by adjacent side walls of the adjacent plates, and
a second channel region connected to the first channel region and defined by a lower wall of the plate of the plurality of active material plates and the base layer,
wherein a width of the second channel region is greater than a width of the first channel region.

15. An electrode structure comprising:
a flat base layer comprising a first active material;
a plurality of active material plates, a plate of the plurality of active material plates comprising opposing side walls and a lower wall, wherein the lower wall is disposed on the base layer, wherein adjacent plates of the plurality of active material plates are spaced apart from each other, and wherein an active material plate of the plurality of active material plates comprises a second active material; and
a channel between adjacent plates of the plurality of active material plates, wherein the channel comprises
a first channel region defined by adjacent side walls of the adjacent plates, and a second channel region connected to the first channel region and defined by a lower wall of the plate of the plurality of active material plates and the base layer, wherein a width of the second channel region is greater than a width of the first channel region, and wherein the cross-sectional shape of the channel is an 'L' shape, or the cross-sectional shape of the channel is a 'T' shape, or the cross-sectional shape of the channel is a 'y' shape, or the opposing side walls are substantially perpendicular to the lower wall.

16. The electrode structure of claim 15, wherein the cross-sectional shape of the channel is an 'L' shape.

17. The electrode structure of claim 15, wherein the cross-sectional shape of the channel is a 'T' shape.

18. The electrode structure of claim 15, wherein the cross-sectional shape of the channel is a 'y' shape.

19. The electrode structure of claim 15, wherein the opposing side walls are perpendicular to the lower wall.

\* \* \* \* \*